Patented Jan. 1, 1952

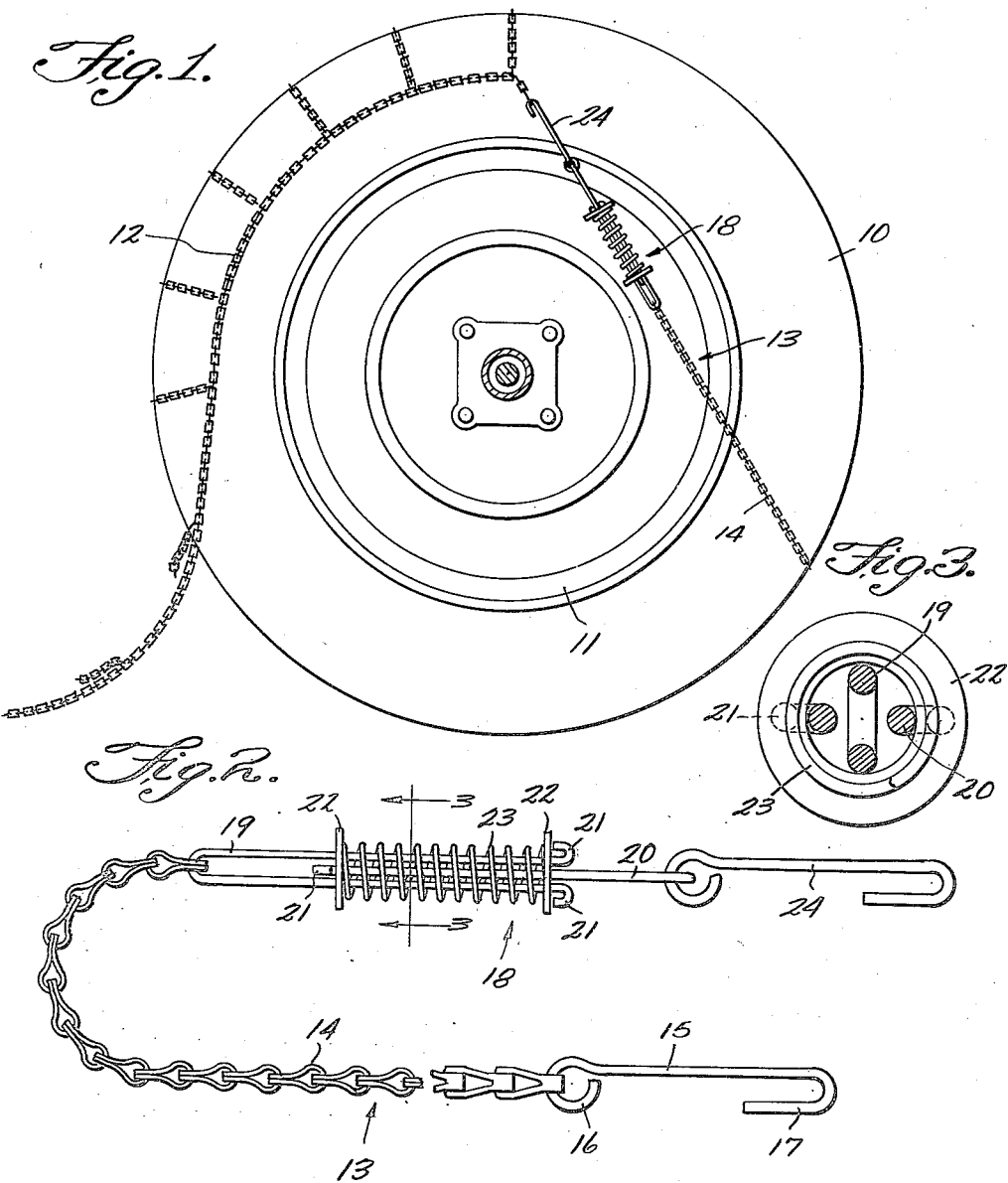

2,581,225

UNITED STATES PATENT OFFICE 2,581,225

FLEXIBLE AND EXPANSIBLE TIRE CHAIN APPLIER

Bryan Anderson, Columbus, Mont., assignor of one-half to M. Lloyd Parcells, Columbus, Mont.

Application June 14, 1948, Serial No. 32,938

1 Claim. (Cl. 81—15.8)

This invention relates to a tire chain applying device.

It is an object of the present invention to provide a chain applying device adapted for use with pneumatic tires to make easy the extension of the tire chains thereover and particularly at times when traction of the tires cannot be had and wherein the leading end of the chain will be connected to the tire and caused to be rotated with the tire as the wheel is turned either by hand or power until the full extent of the chain has covered the tire and the parts or ends of the chain are ready to be coupled together.

Other objects of the present invention are to provide a chain applying device for pneumatic tires which is of simple construction, easy to apply to the tire, inexpensive to manufacture and efficient in operation.

For other objects and for a better understanding of the invention, reference may be had to the following detailed description taken in connection with the accompanying drawing, in which:

Fig. 1 is an elevational view of the chain being applied to a tire and of the tire chain applying device embodying the features of the present invention.

Fig. 2 is an enlarged side elevational view of the tire chain applying device removed from the tire.

Fig. 3 is an enlarged transverse sectional view of the device.

Referring now to the figures, 10 represents a tire on a wheel 11 adapted to be rotated with the wheel and over which there is to be extended a tire chain 12. To this tire chain there is connected, tire applying device 13 of the present invention.

This device 13 comprises a long flexible chain 14 having a hook 15 connected to one end of the same and adapted to engage with one side of the leading end of chain 12. This hook 15 has a loop 16 for the connection of the chain to it and has a bent down hook formation 17 which can be inserted through one of the links of the chain and more particularly through the end link thereof. On the opposite end of the chain 14 there is connected a spring device 18 having relatively slidable U-shaped body members or parts 19 and 20 connected together in telescoping fashion. Each of the parts has outwardly bent fingers or portions 21 on the same engageable with washers or discs 22 to effect the compression of spring 23 when the parts 19 and 20 are pulled away from one another. The spring 23 upon expanding will draw together the parts 19 and 20 whereby to tighten the chain 13 upon the tire when a hook 24 on the part 20 is connected to the opposite side of the chain 12 and particularly to the front side of the chain. The chain 14 is pulled tight about the tire and the spring 23 is compressed in order to make the connection of the hook 24 with the chain end 12.

It will be apparent that with both hooks 15 and 24 secured to the chain 12, that the leading end of the chain 12 will be held secure upon the tire so as to permit the rotation of the tire and chain together and whereby the chain will be fed over the remaining portions of the tire and the leading and trailing ends brought together to a position whereby they can be secured to one another in the usual manner. The spring device 18 will maintain the grip of the chain 14 upon the tire 10.

In using the device in mud or snow, the chain 14 may be placed around diametrically opposite portions of the tire and as the vehicle wheel is turned, the chain will be drawn through the mud or snow wherein the wheel will rise on the chain tread or track and roll out of the depression onto solid ground or on the roadway where the tire chains may be connected or mounted in the usual manner.

While various changes may be made in the detail construction, it shall be understood that such changes shall be within the spirit and scope of the present invention as defined by the appended claim.

I claim:

In a tire chain-applying device, a flexible chain, a hook having a loop connected to one end of said chain, a spring device connected to the other end of said chain, said spring device comprising a pair of U-shaped body members having their open ends bent to provide curved fingers in the plane of the body members, said body members being positioned in planes at right angles to each other for telescoping movement one within the other and with their open ends facing in opposite directions, the bight portion of one of said body members being connected to said chain, a hook connected to the bight portion of the other of said body members, a pair of spaced annular discs slidably surrounding both of said body members and each abutting a corresponding pair of said fingers, and resilient means arranged between said discs, said resilient means comprising a coil spring circumposed upon said body members.

BRYAN ANDERSON.

REFERENCES CITED

The following references are of record in the file of this patent:

UNITED STATES PATENTS

| Number | Name | Date |
|---|---|---|
| 1,374,771 | Smith et al. | Apr. 12, 1921 |
| 1,523,287 | Rawlins | Jan. 23, 1925 |
| 1,567,621 | Salsburg | Dec. 29, 1925 |
| 2,068,887 | Meyers | Jan. 26, 1937 |
| 2,182,439 | Kalbfell | Dec. 5, 1939 |